(12) United States Patent
Edlund et al.

(10) Patent No.: US 8,557,451 B2
(45) Date of Patent: Oct. 15, 2013

(54) FUEL PROCESSOR FOR FUEL CELL SYSTEMS

(75) Inventors: David Edlund, Hopkinton, MA (US); Nathan Palumbo, West Boylston, MA (US); Forrest Harrington, West Boylston, MA (US); Paul Kimball, Nashua, NH (US)

(73) Assignee: Protonex Technology Corporation, Southborough, MA (US)

( * ) Notice: Subject to any disclaimer, the term of this patent is extended or adjusted under 35 U.S.C. 154(b) by 685 days.

(21) Appl. No.: 12/422,061

(22) Filed: Apr. 10, 2009

(65) Prior Publication Data

US 2010/0261074 A1    Oct. 14, 2010

(51) Int. Cl.
*H01M 8/06* (2006.01)
*H01M 8/04* (2006.01)

(52) U.S. Cl.
USPC ........... 429/408; 429/423; 429/433; 429/440; 429/443

(58) Field of Classification Search
USPC .......................... 429/408, 443, 423, 433, 440
See application file for complete search history.

(56) References Cited

U.S. PATENT DOCUMENTS

| | | | |
|---|---|---|---|
| 5,266,080 A | 11/1993 | Kiovsky et al. | |
| 6,221,117 B1 | 4/2001 | Edlund et al. | |
| 6,468,683 B1 | 10/2002 | Menzer et al. | |
| 6,989,134 B2 | 1/2006 | Tonkovich et al. | |
| 7,014,835 B2 | 3/2006 | Mathias et al. | |
| 7,029,647 B2 | 4/2006 | Tonkovich et al. | |
| 7,250,151 B2 | 7/2007 | Tonkovich et al. | |
| 7,344,572 B2 | 3/2008 | Yamamoto | |
| 2003/0192251 A1 | 10/2003 | Edlund et al. | |
| 2004/0151598 A1 | 8/2004 | Young et al. | |
| 2005/0014043 A1 | 1/2005 | Kozu et al. | |
| 2006/0014069 A1 | 1/2006 | Kaye et al. | |
| 2006/0127719 A1 | 6/2006 | Brantley et al. | |
| 2006/0156627 A1 | 7/2006 | Brantley et al. | |
| 2007/0036707 A1 | 2/2007 | Dalla Betta et al. | |
| 2007/0042247 A1 | 2/2007 | Baird et al. | |
| 2007/0062116 A1 | 3/2007 | Edlund et al. | |
| 2008/0305034 A1 | 12/2008 | Edlund et al. | |

OTHER PUBLICATIONS

Tonkovich et al., "Microchannel Chemical Reactors for Fuel Processing" Proceedings of Second International Conference of Microreaction Technology, Mar. 1998, New Orleans, LA, pp. 186-195.

*Primary Examiner* — Patrick Ryan
*Assistant Examiner* — Julian Anthony
(74) *Attorney, Agent, or Firm* — Edwards Wildman Palmer LLP; Christine C. O'Day; George N. Chaclas

(57) ABSTRACT

An elongated fuel processor assembly is coupled to a fuel cell stack for producing a reformate for consumption by the fuel cell stack. The elongated fuel processor assembly includes an annular core having a thermal conduction mass for conducting heat, an annular reformer surrounding and supported by the annular core, and a vaporizer surrounding and supported by the annular core.

19 Claims, 2 Drawing Sheets

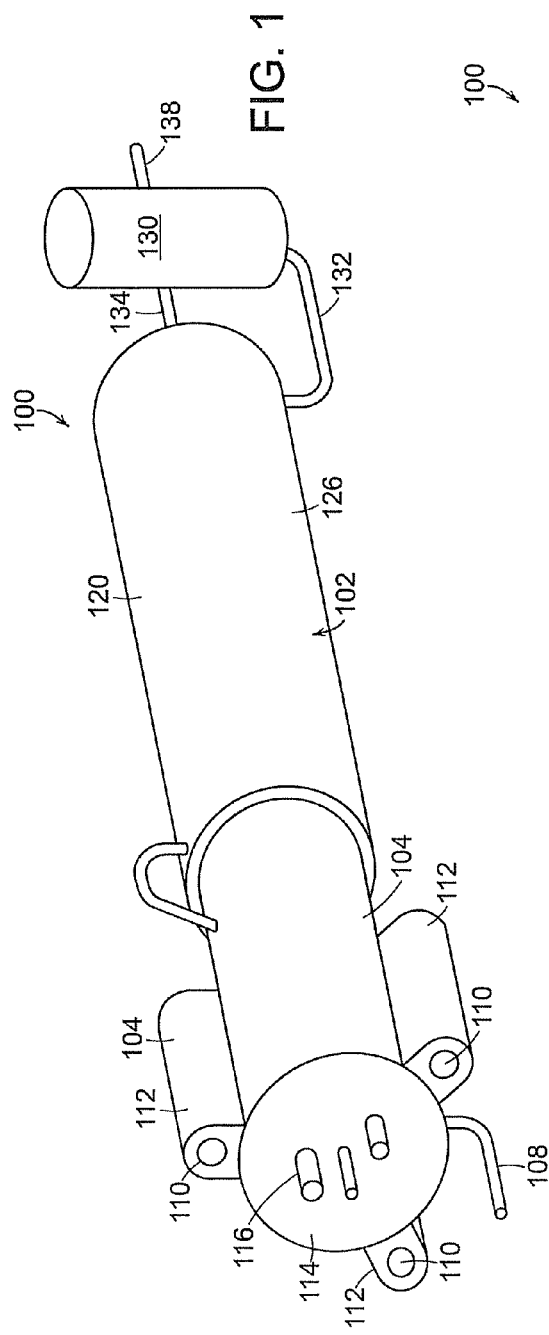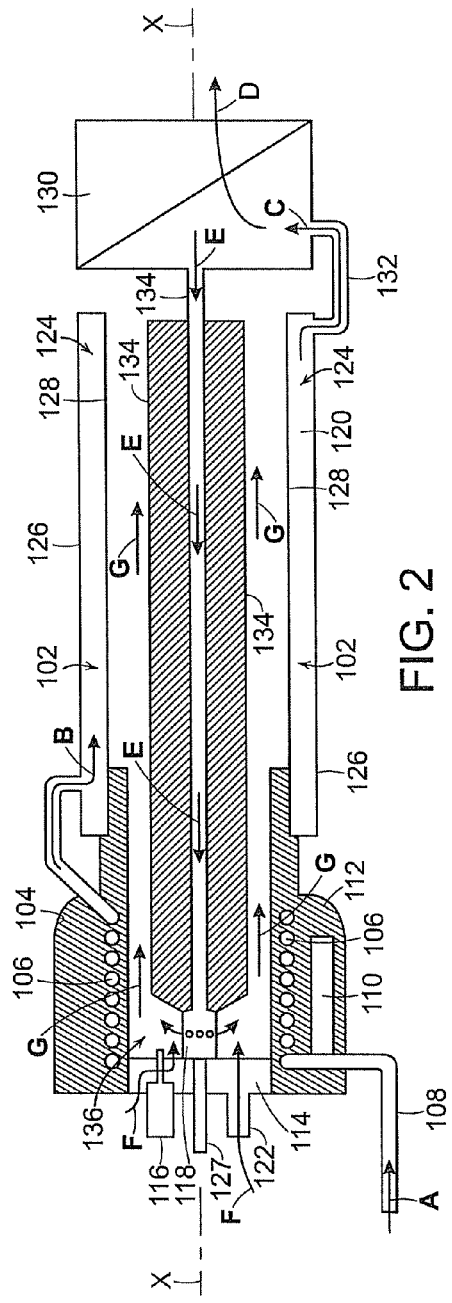

FUEL PROCESSOR FOR FUEL CELL SYSTEMS

BACKGROUND OF THE INVENTION

Fuel cells are electrochemical devices that produce direct current (DC) electricity by the reaction of a fuel with an oxidant, typically producing byproducts of heat and water. Common fuels are hydrogen, methanol, and carbon monoxide; however, carbon monoxide can only be used as a fuel in high-temperature fuel cells operating at temperatures greater than 400° C. The most common oxidant is oxygen, either in a relatively pure form or from ambient air. Fuel cells contain an anode, a cathode, and an electrolyte barrier between the anode and cathode. The fuel is introduced at the anode and the oxidant is introduced at the cathode. The electrolyte barrier, commonly referred to as a membrane-electrode assembly or MEA, is an ionically conductive thin barrier that is relatively impermeable to the fuel and oxidant, and is electrically insulating. Known fuel cell designs and operating principles are described in, for example, The Fuel Cell Handbook, 7th Edition (2004) published by the US Department of Energy, EG&G Technical Services under contract DE-AM26-99FT40575 and in co-owned U.S. patent application Ser. No. 11/484,514, filed Jul. 6, 2007; and Ser. No. 12/006,893, filed Jan. 7, 2008, each of which is incorporated herein by reference.

Many configurations of fuel cell systems are known. Portable fuel cell systems are based on several different types of fuel cells, including proton-exchange membrane fuel cells (PEMFC) that operate at temperatures less than 85° C. and that use high-purity hydrogen as the fuel; PEMFCs that operate at temperatures in the 135° C. to 200° C. range and that use hydrogen-rich reformate as the fuel; direct methanol fuel cells (DMFC) that operate at temperatures less than 85° C. and that use methanol as the fuel; and solid oxide fuel cells (SOFC) that operate at temperatures in the range of 500° C. to 900° C. and that use hydrogen-rich reformate as the fuel.

Fuel processors prepare the fuel supply for use by the fuel cell. Often the fuel processor has many components including a vaporizer or reformer. Conventional reformers are a bundle of tubes having large diameters in the range of 25-150 mm. Each tube is packed with granules or bulk material to form a catalytic bed. Such tubes are relatively inexpensive and the technology has been utilized to meet large scale requirements. Mechanical events such as vibrations and shocks can break down the bed. Often, channels form that undesirably create flowpaths that allow the fuel stream to pass without significant reaction.

The fuel preparation process is also endothermic so that heaters are used to externally apply heat to the tubes to increase process efficiency. Due to the large size and wall thickness of the tubes, the reaction to the heating process is relatively slow (i.e., an undesirable gradient occurs). Further, the bed can break down during this thermal cycling.

Velocys, Inc. of Plain City, Ohio has developed an alternative microchannel reactor in an effort to overcome the slow heat gradient. For example, see U.S. Pat. Nos. 7,250,151; 7,029,647; 7,014,835; and 6,989,134, each of which is incorporated herein by reference. Velocys, Inc. forms microchannels of 0.1-1.0 mm in a thin metal plate. Because the microchannels are so small, a bulk material cannot be used as a catalyst. Rather, a wash coat of a catalyst material is applied. Hence, the heat applied to the plate is very quickly transferred to the reaction zone. To scale up the microchannel technology, a plurality of plates are stacked. Unfortunately, the microchannel technology is expensive to manufacture and heavy as a large amount of a metal such as steel is necessary.

Thus, there is a need for a fuel processor for a fuel cell system that is affordable, has a small temperature gradient and is robust under mechanical duress and thermal cycling. The present invention addresses these needs among others.

SUMMARY OF THE INVENTION

The subject technology relates to portable and other fuel cell systems incorporating a fuel reformer that converts a liquid or gaseous fuel to a hydrogen-rich reformate stream. The fuel reformer has a small temperature gradient and a light, robust design suitable for wide application in the art of fuel cells.

In one embodiment, the subject technology is directed to a fuel cell system including a fuel cell stack and a fuel processor assembly coupled to the stack for producing a reformate for consumption by the stack. The fuel processor assembly includes an annular reformer, a thermal conduction mass coupled to the annular reformer, and a vaporizer coupled to the thermal conduction mass.

In a further embodiment, the annular reformer has a first cylindrical wall portion surrounded by a second cylindrical wall portion to form an annular gap, each wall portion having a catalyst applied to at least a portion of a respective surface forming the annular gap. Still another embodiment includes the thermal conduction mass having an annular shape with at least a portion contacting a portion of the first cylindrical wall portion, wherein the portion of the first cylindrical wall portion contacting the thermal conduction mass is fabricated from a heat conducting material.

A further embodiment is directed to a fuel cell system wherein the thermal conduction mass has a central passage aligned with a central passage of the annular reformer. A feedback tube mounts within the central passages for providing the portion of the reformate to the combustion heater and directing flow of the combustion gases therefrom. The fuel cell system may also include a hydrogen purification membrane coupled to an output of the reformer.

The thermal conduction mass may be at least partially nested within the annular reformer. Also, the annular reformer may include means for improving catalytic reactions therein, the means being selected from the group consisting of inserts, metal foam, a stack of annular metal screens, a roll of metal screens, a roll of perforated metal, a roll of perforated corrugated metal foil, catalytic granules, bulk material to form a catalytic bed, and combinations thereof. In one embodiment, the thermal conduction mass and vaporizer are annular, and the thermal conduction mass nests within the annular reformer and vaporizer.

In still another preferred embodiment, the thermal conduction mass forms a central passage, and a heater is located within the central passage for heating the thermal conduction mass such that exhaust gases from the heater pass through the central passage to heat the thermal conduction mass. A housing may surround the annular reformer, thermal conduction mass, and vaporizer to form a hot zone and an exhaust passage around the annular reformer and vaporizer, wherein the exhaust gases counterflow through the exhaust passage with respect to the central passage and, thereby, further transfer heat to the annular reformer and vaporizer.

In another embodiment, the subject technology is directed to an elongated fuel processor assembly coupled to a fuel cell stack for producing a reformate for consumption by the fuel cell stack. The elongated fuel processor assembly includes an annular core having a thermal conduction mass for conducting heat, an annular reformer surrounding and supported by the annular core, and a vaporizer surrounding and supported by the annular core. The annular core, the annular reformer, and the vaporizer may have circular symmetry. The elongated fuel processor assembly may further include a shell forming cavities for containing the annular reformer and vaporizer, wherein the cavities are enclosed by the annular core such that a plenum adjacent to the vaporizer is formed.

It should be appreciated that the present technology can be implemented and utilized in numerous ways, including without limitation as a process, an apparatus, a system, a device, or a method for applications now known and later developed. These and other unique features of the subject technology disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 1 is a perspective view of an exemplary reforming reactor assembly in accordance with the subject technology.

FIG. 2 is a cross-sectional view of the reforming reactor assembly of FIG. 1.

DETAILED DESCRIPTION OF PREFERRED EMBODIMENTS

Figure 3:
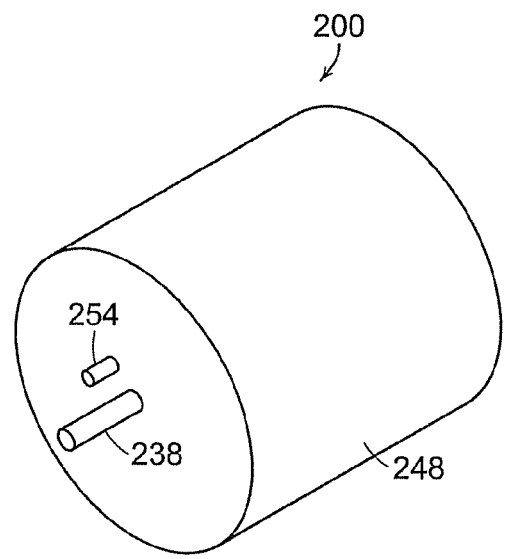
FIG. 3 is a perspective view of another exemplary reforming reactor assembly in accordance with the subject technology.

The present disclosure overcomes many of the prior art problems associated with reforming reactors that provide fuel in fuel cells. The advantages, and other features of the reforming reactors disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. All relative descriptions herein such as left, right, up, and down are with reference to the Figures, and not meant in a limiting sense.

A fuel cell system in accordance with the subject technology includes a fuel cell stack and a reforming reactor operatively coupled to fuel cell stack for providing the stack with fuel, e.g., hydrogen. The reforming reactor is fed fuel, such as a methanol and water mixture, from a fuel reservoir. All of the system's components may be contained within a substantially airtight, openable insulated system case, which functions as a hot zone.

In one embodiment, the fuel reservoir contains a 60/40 mix of methanol and water. The fuel may be methanol, ethanol, ethylene glycol, glycerol, propane, natural gas, diesel and the like in various mixtures. The selection of fuel has a strong influence on the operating temperature of the reforming reactor. Also, optional hydrogen purification methods downstream from the reforming reactor may influence the preferred operating temperature and the outlet temperature. For instance, if a palladium-alloy hydrogen-purification membrane module is employed, the preferred outlet temperature of the reforming reactor should be approximately the same as the operating temperature of the membrane module, about 350 degrees C. to 450 degrees C.

The fuel is pumped from a fuel reservoir into the reforming reactor assembly by a fuel pump. The flow rate of fuel into the reforming reactor assembly is preferably regulated. The fuel mix may further contain additives in low concentration to make the fuel mix safer. The fuel mix also preferably contains a dye that colors the fuel so that it is easily distinguishable from water. A control unit for controlling operation of components in the hot zone may be located inside or outside the hot zone and communicate with sensors in the hot zone.

Referring now to FIGS. 1 and 2, a reforming reactor assembly 100 is shown in perspective and cross-sectional view, respectively. The reforming reactor assembly 100 includes a reforming reactor 102 coupled to an aluminum or aluminum alloy casting 104 for providing mass to retain and distribute heat. Preferably, the reforming reactor 102 and casting 104 press fit together so that the casting 104 supports the reforming reactor 102. Preferably, at least 20% of the inner wall 128 of the reforming reactor 102 is intimately contacted by casting 104.

A vaporizer coil 106 extends through the casting 104 for vaporizing and preheating fuel, e.g., a methanol/water feedstock. Although the vaporizer coil 106 has an inlet 108 that extends partially out of the casting 104 to connect to the fuel reservoir (not shown), the operative part of the vaporizer coil 106 is mostly, if not completely, enclosed in the thermal-conduction mass of the casting 104.

Electric heaters 110, such as cartridge heaters, are also inserted into the thermal-conduction mass of the casting 104. The casting 104 may form protrusions or shoulders 112 for retaining the electric heaters 110. During a cold start, the electric heaters 110 are energized to heat the casting and, in turn, the vaporizer coil 106 and the left or front portion of reforming reactor 102. Alternatively a band heater could be used.

The reforming reactor assembly 100 also has an inlet header 114 coupled to one end of the casting 104. The inlet header 114 may be press fit into the casting 104 or the like for securement. The inlet header 114 has an air inlet 122 for intake of ambient air. The inlet header 114 also includes an igniter 116 for sparking a flame on a centrally-located combustion heater 118, which coupled to the inlet header 114 and further secured in place by a mount 127. The combustion heater 118 is located to heat the casting 104 and/or at least a portion of the annular-gap reforming reactor 102 during operation as described in more detail below.

The reforming reactor 102 includes a housing 120 that defines an inner annular gap 124 between an outer wall 126 and an inner wall 128. The annular gap 124 is relatively small, from about 0.03" to 0.5". Preferably the gap is from 0.04" to 0.08". Catalyst is preferably wash-coated onto at least a portion of the wall surfaces 126, 128 that form the annular gap 124. If it is advantageous to have a large amount of catalyst in the annular gap 124, the catalyst can be applied completely to the wall surfaces 126, 128.

Additionally, any inserts that fit within the annular gap 124 may also have catalyst applied thereto. For example, a corrugated foil (for example stainless steel, aluminum, and/or an alloy such as a combination of iron, chromium, aluminum, and yttrium) may be coated with catalyst and then wound into a cylindrical shape and placed within the annular gap 124 to yield more surface area coated with catalyst than can be applied to just the wall surfaces 126, 128. Suitable catalysts for wash coating include the platinum-group metals, especially platinum and/or palladium.

Alternatively, rather than applying the catalyst as a wash coating onto the wall of the reactor or insert, a granular form of the catalyst may be placed within the annular gap 124. If this is done, the granule size should be appropriately selected for the annular gap dimensions. Specifically, the catalyst granule (or particle) size is preferably no larger than $\frac{1}{5}^{th}$ the size of the annular gap 124. Suitable catalysts for use in granular form include the platinum-group metals (especially platinum and/or palladium) and base metals (especially copper, zinc oxide, and/or chromium oxide).

Preferably, the vaporizer coil 106, the casting 104, and the annular gap reforming reactor 102, all have circular symmetry around a common central axis "x". The reforming reactor assembly 100 has generally cylindrical geometry and circular symmetry. In other words, in the cross-sectional view of FIG. 2, the upper portion has symmetry with the lower portion. Although a tubular shape for the reforming reactor 102 is convenient and inexpensive, the reformer may be virtually any other shape, including rectangular.

The reforming reactor assembly 100 may be used with or without an associated hydrogen-purification membrane module 130. The hydrogen-purification membrane module 130 is shown somewhat schematically in FIG. 2. The housing 120 of the reforming reactor 102 has an outlet 132 connected to the hydrogen-purification membrane module 130 for providing the reformate thereto. The hydrogen-purification membrane module 130 generates a purified stream of hydrogen for use by the fuel cell stack. The hydrogen-purification membrane module 130 also has a feedback tube 134 for providing a small portion of the reformate to the combustion heater 118 as fuel.

In Operation

The reforming reactor assembly 100 is designed to operate over a range of temperature, typically about 300° C. to 450° C., for reforming a mixture of methanol and water to a hydrogen-rich reformate stream. A preferred methanol/water mixture contains between 40 wt % and 66 wt % methanol with the balance being water but higher or lower concentrations may be used as well. A more preferred methanol/water mixture contains from 45 wt % to 64 wt % methanol.

The reforming reactor assembly 100 may be operated at ambient pressure or at elevated pressure. However, if a hydrogen-purification membrane module 130 is used in conjunction with the reforming reactor assembly 100, then the operating pressure should be elevated, preferably to a pressure in the range of 80 psig to 250 psig, and more preferably within the range of 120 psig to 180 psig to facilitate good performance of the hydrogen-purification membrane module 130.

The vaporizer coil 106 and annular gap reforming reactor 102 must be hot to operate practically because the kinetics of reaction are undesirably slow at temperatures less than about 200° C. To heat the vaporizer coil 106 and possibly a portion of the annular gap reforming reactor 102 from a cold state, the electric heaters 110 are activated. As the casting 104 is heated, the casting 104 distributes the heat to the vaporizer coil 106 and at least a portion of the annular-gap reforming reactor 102 by direct conduction of heat to commonly shared surfaces.

Once the vaporizer coil 106 and annular-gap reformer 102 are heated to about 250° C. or greater, the flow of methanol/water mixture to the vaporizer coil 106 commences and the reforming process begins. The fuel is pumped through the inlet 108 into the vaporizer coil 106 as shown by flow arrow A. In the vaporizer coil 106, the fuel is vaporized. As the vaporizer coil 106 has been heated, the fuel vapor is also heated in the vaporizer coil 106.

The fuel vapor exits the vaporizer coil 106 and flows into the reforming reactor 102 as shown by flow arrow B. Chemical reactions accelerate within the annular gap 124 because of the catalyst such that the fuel is converted into a reformate. For a methanol/water mixture, the resulting reformate is a mixture comprising mostly carbon dioxide ($CO_2$), carbon monoxide (CO), and hydrogen ($H_2$). Hot reformate exits the annular gap 124 via the outlet 132 and enters the hydrogen-purification membrane module 130 as shown by flow arrow C. The hydrogen-purification membrane module 130 creates a product stream of purified $H_2$, as shown by flow arrow D, which exits the reforming reactor assembly 100 via outlet 138.

Once the reforming reactor system 100 is under steady-state normal operation, the casting 104, vaporizer coil 106, and reforming reactor 102 (particularly the inner wall 128) are heated directly by combustion in the combustion heater 118. The burner or combustion heater 118 is ignited using the spark igniter 116 but other means such as a pilot flame, a hot surface igniter, or the like may be used. A combustion region 136 forms around the combustion heater 118 within the casting 104.

As denoted by flow arrows E, a portion of the reformate stream is diverted from the hydrogen-purification membrane module 130 via the feedback tube 134 to provide a source of fuel for the combustion heater 118. As noted above, the combustion heater 118 is fed air via the air inlet 108 and inlet header 114 as denoted by flow arrows F. As denoted by flow arrows G, the resulting hot combustion gases circulate around the feedback tube 134 to further warm the reforming reactor 102 as the combustion gases exit. As a result, the combustion heater 118 serves to heat and maintain the temperature of the vaporizer coil 106 and annular gap reforming reactor 102 by a normal combustion process using reformate and air.

Second Embodiment

Figure 4:
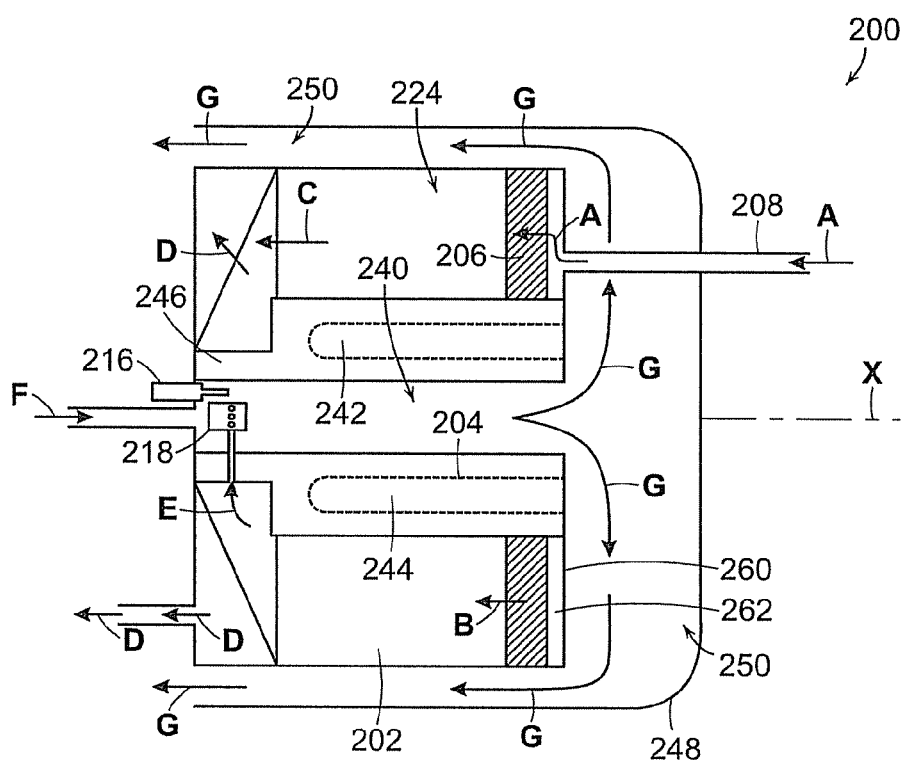
FIG. 4 is a cross-sectional view of the reforming reactor assembly of FIG. 3.

Referring now to FIGS. 3 and 4, another reforming reactor assembly 200 is shown in perspective and cross-sectional view, respectively. As will be appreciated by those of ordinary skill in the pertinent art, the reforming reactor assembly 200 utilizes some similar principles to the reforming reactor assembly 100 described above. Accordingly, like reference numerals preceded by the numeral "2" instead of the numeral "1", are used to indicate like elements.

The reforming reactor assembly 200 includes a centrally located annular core 204. The core 204 is a thermally conducting material such as aluminum. The core 204 defines a central passage 240.

An annular vaporizer 206 surrounds and is supported by one end 242 of the core 204. The vaporizer 206 may be a metal foam such as aluminum foam, compressed metal foam, stacks of annular metal screens, stacks of annular metal screens separated by metal washers, and other designs. By using such structure, the vaporizer 206 has high surface area and good thermal conduction. Similar to above, the vaporizer 206 desolvates and preheats a liquid feedstock or fuel. By contacting and surrounding the thermal-conduction core 204, heat is readily transferred from the core 204 to the annular vaporizer 206. The annular vaporizer 206 receives the fuel via an inlet 208.

The reforming reactor assembly 200 also includes an annular reforming reactor 202 surrounding and supported by a central portion 244 of the core 204. The reforming reactor 202 is adjacent the vaporizer 206. It is envisioned that the reforming reactor 202 will have a high surface area and good thermal conduction.

The core 204 is preferably integral or in intimate contact with the reforming reactor 202 and/or the vaporizer 206 so that heat is efficiently transferred. In another embodiment, the annular reforming reactor 202 and vaporizer 206 are separate from the core 204 but include thermally conducting material in contact with the core 204 to facilitate heat transfer from the core 204 to the annular reforming reactor.

The reforming reactor 202 defines a larger gap 224 than the embodiment of FIG. 1. Accordingly, applying the catalyst as a wash coating or inserting a granular form of the catalyst within the annular gap 224 may not be highly efficient.

The annular reforming reactor 202 may also be fabricated using a metal foam such as aluminum foam, a stack of annular metal screens, a roll of metal screens, a roll of perforated metal, a roll of perforated corrugated metal foil, and other designs.

Still referring to FIGS. 3 and 4, an annular membrane module 230 surrounds and is supported by another end 246 of the core 204. The membrane module 230 mounts adjacent the reforming reactor 202. The membrane module 230 is also in contact with the core 204 to facilitate heat transfer. The membrane module 230 separates pure hydrogen from reformate. As can be seen, the core 204 performs the dual function of conducting heat from the heater 218 and/or electric cartridge heater, if present, as well as supporting the reforming reactor 202, vaporizer 206, and hydrogen purification membrane module 230. Similar to above, the annular gap reforming reactor 202, the core 204, and the vaporizer 206 all have circular symmetry around a common central axis "x".

The annular gap reforming reactor 202, the core 204, and the vaporizer 206 also may share a single outer shell 260. The outer shell may have dividing walls or other structure to form cavities for each of the annular gap reforming reactor 202, the core 204, and the vaporizer 206. The outer shell 260 may be formed so that these cavities are enclosed by the core 204 on the inner radius. Catalytic inserts and other components may mount directly to the outer shell 260 and/or the core 204. As can be seen in FIG. 4, the outer shell 260 forms a plenum area 262 for pressurized fuel to collect from the fuel supply prior to entry into the vaporizer 206.

As needed, electric heaters (not shown), such as cartridge heaters, may be inserted in the core 204. A combustion heater 218 is centrally located within the central passage 240 to heat the core 204. A housing 248 surrounds the reforming reactor 202 to create a hot zone therein. The housing 248 also forms combustion exhaust passageway 250 in communication with the central passage 240 of the core 204.

In Operation

During a cold start, the electric heaters are energized to heat the core 204, vaporizer 206, and a front portion of reforming reactor 202. Once the vaporizer 206 and annular reformer are heated to about 250° C. or greater, the flow of fuel to the vaporizer 206 commences and the reforming process begins. The reactor is designed to operate over a range of temperature, typically about 300° C. to 450° C. The fuel is pumped into the annular vaporizer 206 via the fuel inlet 208 as denoted by flow arrows A. In the vaporizer 206, the fuel is vaporized and heated, then the vaporized fuel flows into the annular reformer reactor 202 as denoted by flow arrow B. In one embodiment, a thin metal plate (not shown) separates the vaporizer region from the reforming region. An annular arrangement of circular holes are formed in the thin metal plate to allow flow along arrow B.

Hot reformate exits the reforming reactor 202 and enters the annular hydrogen-purification membrane module 230 as denoted by flow arrow C. In one embodiment, another thin metal plate with an annular arrangement of circular holes or a wire-cloth flat filter sheet is utilized to separate the reforming region from the hydrogen purifier and allow flow along arrow C. The membrane module 230 purifies the reformate stream to yield a hydrogen stream, as denoted by flow arrows D. The hydrogen stream exits the reforming reactor assembly 200 via outlet 238.

A portion of the reformate stream is redirected to the centrally located combustion heater 218 for consumption to generate heat that is transferred to the vaporizer 206 and reforming reactor 202. The igniter 216 starts the combustion heater 218. Air is also provided to the combustion heater 218 via the air inlet 222, as denoted by flow arrow F, to facilitate combustion. The combustion gases generated by the combustion heater 218 pass through the central passage 240 and through the exhaust passage 250 in order to exit the housing 248 via an exhaust outlet 254 as denoted by flow arrows C. As the hot combustion gases exit, the combustion gases also transfer heat to the core 204, vaporizer 206, reforming reactor 202, and membrane module 230.

Fuel processor assemblies in accordance with the subject technology offer a benefit of being able to heat from a cold state to the elevated operating temperature by using convenient electric heating elements. It is typical for conventional fuel processors to use combustion of a fuel to heat the vaporizer and reactor from a cold state to the elevated operating temperature. The drawbacks of using combustion for this purpose include high emissions of harmful and objectionable exhaust gases due to quenching on cool metal surfaces, added complexity, and safety concerns related to the combustion process. Additionally, the annular reactor design with catalyst applied to metal heat-transfer surfaces results in a beneficial increase in reaction rates and, thus, an overall reduction in size and cost of the reformer.

The terms and expressions which have been employed in the foregoing specification are used therein as terms of description and not of limitation. The claims may also depend from any other claim in any order and combination with all elements present or one or more elements removed. Further, there is no intention in the use of such terms and expressions of excluding equivalents of the features shown and described or portions thereof, it being recognized that the scope of the invention is defined and limited only by the claims which follow.

What is claimed is:

1. A fuel cell system comprising:
   a) fuel cell stack; and
   b) a fuel processor assembly coupled to the stack for producing a reformate for consumption by the stack, wherein the fuel processor assembly includes:
      i) an annular reformer;
      ii) a thermal conduction mass coupled to the annular reformer; and
      iii) a vaporizer coupled to the thermal conduction mass;
   wherein the vaporizer is a coil that wraps around the annular reformer.

2. A fuel cell system as recited in claim 1, wherein the annular reformer has a first cylindrical wall portion surrounded by a second cylindrical wall portion to form an annular gap, each wall portion having a catalyst applied to at least a portion of a respective surface forming the annular gap.

3. A fuel cell system as recited in claim 2, wherein the catalyst is wash-coated.

4. A fuel cell system as recited in claim 3, wherein the portion of the first cylindrical wall portion contacting the thermal conduction mass is fabricated from a heat conducting material.

5. A fuel cell system as recited in claim 2, wherein the thermal conduction mass has an annular shape with at least a portion contacting a portion of the first cylindrical wall portion.

6. A fuel cell system as recited in claim 1, wherein the thermal conduction mass is cast onto the vaporizer coil.

7. A fuel cell system as recited in claim 1, further comprising a hydrogen purification membrane coupled to an output of the reformer.

8. A fuel cell system as recited in claim 1, wherein the thermal conduction mass is at least 20% nested within the annular reformer.

9. A fuel cell system as recited in claim 1, wherein the annular reformer includes means for improving catalytic reactions therein, the means being selected from the group consisting of inserts, metal foam, a stack of annular metal screens, a roll of metal screens, a roll of perforated metal, a roll of perforated corrugated metal foil, catalytic granules, bulk material to form a catalytic bed, and combinations thereof.

10. A fuel cell system as recited in claim 1, wherein
the thermal conduction mass and vaporizer are annular, and
the thermal conduction mass nests within the annular reformer and vaporizer.

11. A fuel cell system as recited in claim 10,
wherein the thermal conduction mass forms a central passage, and
further comprising a heater located within the central passage for heating the thermal conduction mass such that exhaust gases from the heater pass through the central passage to heat the thermal conduction mass.

12. A fuel cell system as recited in claim 11, further comprising a housing surrounding the annular reformer, thermal conduction mass, and vaporizer to form a hot zone and an exhaust passage around the annular reformer and vaporizer, wherein the exhaust gases counterflow through the exhaust passage with respect to the central passage and, thereby, further transfer heat to the annular reformer and vaporizer.

13. A fuel cell system as recited in claim 10, further comprising an annular hydrogen purification membrane module coupled to the annular reformer and having the thermal conduction mass at least partially nested therein.

14. A fuel cell system as recited in claim 1, further comprising:
a combustion heater adjacent the thermal conduction mass for burning a portion of the reformate to provide heat to the thermal conduction mass during normal operation; and
at least one heating element coupled to the thermal conduction mass for providing heat to the thermal conduction mass during a cold start.

15. A fuel cell system as recited in claim 14, wherein combustion gases from the combustion heater circulate through the thermal conduction mass to heat the thermal conduction mass.

16. A fuel cell system comprising:
a) a fuel cell stack: and
b) a fuel processor assembly coupled to the stack for producing a reformate for consumption by the stack, wherein the fuel processor assembly includes:
i) an annular reformer,
ii) a thermal conduction mass coupled to the annular reformer,
iii) a vaporizer coupled to the thermal conduction mass,
iv) a combustion heater adjacent the thermal conduction mass for burning a portion of the reformate to provide heat to the thermal conduction mass during normal operation, and
v) at least one heating element coupled to the thermal conduction mass for providing heat to the thermal conduction mass during a cold start:
wherein combustion gases from the combustion heater circulate through the thermal conduction mass to heat the thermal conduction mass,
wherein the thermal conduction mass has a central passage aligned with a central passage of the annular reformer, wherein the combustion gases pass through the central passages, and
further comprising a feedback tube mounted within the central passages for providing the portion of the reformate to the combustion heater and directing flow of the combustion gases therefrom.

17. A fuel processor assembly coupled to a fuel cell stack for producing a reformate for consumption by the fuel cell stack, wherein the fuel processor assembly comprises:
a) an annular core having a thermal conduction mass for conducting heat;
b) an annular reformer surrounding and supported by the annular core; and
c) a vaporizer surrounding and supported by the annular core; and
wherein the vaporizer is a coil that wraps around the annular reformer.

18. A fuel processor assembly as recited in claim 17, wherein the annular core, the annular reformer, and the vaporizer have circular symmetry.

19. A fuel processor assembly as recited in claim 17, further comprising a shell forming cavities for containing the annular reformer and vaporizer, wherein the cavities are enclosed by the annular core such that a plenum adjacent to the vaporizer is formed.

* * * * *